(12) United States Patent
Savic

(10) Patent No.: US 8,137,772 B2
(45) Date of Patent: Mar. 20, 2012

(54) MULTILAYER TUBULAR FILM BASED ON POLYAMIDE

(75) Inventor: Zoran Savic, Vienna (AT)

(73) Assignee: Podanfol S.A., Chodziez (PL)

( * ) Notice: Subject to any disclaimer, the term of this patent is extended or adjusted under 35 U.S.C. 154(b) by 1593 days.

(21) Appl. No.: 09/946,960

(22) Filed: Sep. 6, 2001

(65) Prior Publication Data

US 2002/0090472 A1  Jul. 11, 2002

(30) Foreign Application Priority Data

Sep. 6, 2000 (DE) .................................. 100 43 899

(51) Int. Cl.
   *B32B 1/08* (2006.01)
   *B32B 23/00* (2006.01)
(52) U.S. Cl. ................... 428/34.3; 428/35.7; 428/475.8; 428/476.1; 428/476.3; 138/118
(58) Field of Classification Search .................. 428/34.3, 428/35.7, 475.8, 476.1, 476.3; 138/118
   See application file for complete search history.

(56) References Cited

U.S. PATENT DOCUMENTS

| | | | | |
|---|---|---|---|---|
| 4,243,074 A | * | 1/1981 | Struzel et al. | 428/34.8 |
| 4,525,418 A | | 6/1985 | Dinklage et al. | |
| 4,560,520 A | * | 12/1985 | Erk et al. | 264/22 |
| 5,185,189 A | | 2/1993 | Stenger et al. | 428/34.8 |
| 5,308,666 A | * | 5/1994 | Borchardt | 428/35.2 |
| 5,364,674 A | | 11/1994 | Saal et al. | |
| 5,549,943 A | * | 8/1996 | Vicik | 428/34.8 |
| 5,612,104 A | | 3/1997 | Grund | |
| 5,803,130 A | * | 9/1998 | Robben et al. | 138/137 |
| 6,116,142 A | | 9/2000 | Bunge | 91/436 |

FOREIGN PATENT DOCUMENTS

| | | |
|---|---|---|
| DE | 41 30 486 A1 | 2/1993 |
| DE | 43 39 337 A1 | 5/1995 |
| DE | 196 50 383 A1 | 6/1998 |
| DE | 198 55 867 A1 | 5/1999 |
| DE | 198 60 142 A1 | 6/2000 |
| EP | 0 453 925 A1 | 10/1991 |
| EP | 0 467 039 | 8/1995 |
| EP | 0 589 436 | 7/1997 |
| EP | 0 589 431 | 6/1998 |
| EP | 0 923 870 A1 | 6/1999 |
| FR | 2 517 178 A1 | 6/1983 |
| WO | WO 97/49293 | 12/1997 |
| WO | WO-99/33653 * | 7/1999 |

* cited by examiner

*Primary Examiner* — Marc Patterson
(74) *Attorney, Agent, or Firm* — Foley & Lardner LLP

(57) ABSTRACT

Multilayer tubular film based on polyamide comprising
an outer polymer layer based on aliphatic or partially aromatic polyamides or copolyamides or blends thereof, up to 30% by weight of which, based on the outer layer, can be replaced by other polymers,
a middle polyamide layer based on ethylene-$C_{1-8}$-alkyl acrylate copolymers and
ethylene-maleic anhydride copolymers and/or ethylene-$C_{1-8}$-alkyl acrylate-maleic anhydride copolymers,
up to 20% by weight of which, based on the middle layer, can be replaced by other polymers,
an inner polymer layer based on 40 to 100% by weight, based on the inner layer, of aliphatic or partially aromatic polyamides or copolyamides or blends thereof, 0 to 60% by weight of carboxyl-containing ethylene copolymers or their salts and 0 to 20% by weight of other polymers, the total amount of which gives 100% by weight.

13 Claims, No Drawings

MULTILAYER TUBULAR FILM BASED ON POLYAMIDE

The invention relates to a multilayer tubular film based on polyamide for receiving pasty filling. In particular it is a biaxially oriented, thermoset tubular film, which can preferably be used as sausage casing or packaging casing for meat products.

Biaxially oriented polyamide tubular films are widely used as barrier films for packaging foods. In this use polyamide acts as a barrier medium especially against the passage of oxygen to the packaged food, while the barrier action against the egress of water from the food (drying) is less. To improve the water barrier action, the polyamide films are coextruded with polyolefins or similar polymers. Partially aromatic polyamides, for example of the type nylon 6I/6T, can also be added to standard polymers. Biaxially oriented tubular films are used, in particular, in the sausage industry. In this use the scalded-emulsion sausage meat is stuffed into tubular films which are closed at both ends and are then generally cooked. As a result of the cooking shrinkage typical of biaxially oriented films, a tightly filled round sausage is obtained. In addition to the production of scalded-emulsion and cooked-meat sausage, the tubular films also serve for receiving other raw or heat-treated meat products. Fields of application other than as barrier shrinkfilms are also known in the food industry.

EP-A-0 589 431 describes heat-shrinkable nylon casings for foods. In particular, at least three-layer films are described that have a polyamide-containing inner layer, a middle layer that comprises at least 50% by weight of ethylene/phenyl acetate copolymer that has at least 70% by weight of ethylene units mixed with at least 10% by weight of ethylene/methacrylic acid copolymer, and have a polyamide-containing outer layer. The middle layer is, in particular, a 70:30 blend of an ethylene-vinyl acetate copolymer and an ethylene-methacrylic acid copolymer.

EP-A-0 589 436 also relates to a heat-shrinkable food casing based on nylon. The tubular, biaxially oriented and tempered heat-shrinkable multilayer film has an inner layer that comprises at least 60% by weight of a polyamide or a blend of polyamides, a core layer that comprises at least 60% by weight of a polyolefin, and an outer layer that comprises at least 60% by weight of a polyamide or a blend of polyamides. The core layer is directly joined to the inner layer and the outer layer by coextrusion or extrusion coating. The multilayer film has, after tempering, a shrinkage value at 90° C. of at least 20% in at least one direction. As core layer, in particular, a 70:30 blend of very low density polyethylene and an ethylene-methacrylic acid copolymer is used.

EP-A-0 467 039 relates to a multilayer tubular packaging casing. The packaging casing has an outer layer based on aliphatic polyamide, aliphatic copolyamide or a blend of these polymers, a middle layer that consists of polyolefin, an adhesion promoter and if appropriate dye or color pigments, the adhesion promoter being a polyolefin resin modified with functional groups, and an inner layer based on aliphatic and/or partially aromatic copolyamides. The packaging casing has, in particular under the action of heat up to about 90° C., a shrinkage of less than 20% in the longitudinal and transverse directions. The middle layer is, in particular, a blend of high density polyethylene and an adhesion promoter based on an ethylene copolymer of very low density that has acrylic acid groups.

The multilayer biaxially oriented polyamide/polyolefin composite tubular films described generally have diameters of 20-200 mm and are manufactured in wall thicknesses of 40-70 micrometers. They have, in particular, an internal polyamide layer of defined adhesion to the food mix or to the sausage meat emulsion. However, the known tubular films do not have a profile of properties suitable for all applications. In particular in the case of differing fillings, the adhesion of the tubular films to the contents is not always satisfactory.

The object of the present invention is to provide multilayer tubular films, in particular for the food industry, which avoid the disadvantages of the known films and, in particular, can be adapted in a versatile manner to the most varied constituents, a desired degree of adhesion being achieved.

The object is achieved according to the invention by a multilayer tubular film based on polyamide comprising an outer polymer layer based on aliphatic or partially aromatic polyamides or copolyamides or blends thereof, up to 30% by weight of which, based on the outer layer, can be replaced by other polymers, a middle polymer layer based on
ethylene-$C_{1-8}$-alkyl acrylate copolymers and
ethylene-maleic anhydride copolymers and/or ethylene-$C_{1-8}$-alkyl acrylate-maleic anhydride copolymers, up to 20% by weight of which, based on the middle layer, can be replaced by other polymers, an inner polymer layer based on 40 to 100% by weight, based on the inner layer, of aliphatic or partially aromatic polyamides or copolyamides or blends thereof, 0 to 60% by weight of carboxyl-containing ethylene copolymers or their salts and 0 to 20% by weight of other polymers, the total amount of which gives 100% by weight.

The inventive multilayer tubular film preferably has a diameter of 20 to 200 mm. The total wall thickness is preferably 25 to 85 micrometers, particularly preferably 30 to 70 micrometers, in particular 40 to 70 micrometers. The inventive tubular film, compared with the known tubular films, has an improved middle polymer layer (barrier layer) and, depending on the food product type, the adhesion of the inner layer may be varied. For example, an unmodified internal polyamide layer has a relatively high adhesion which is suitable, in particular, for scalded-emulsion sausage types having a tendency to gel formation. For formulations having a high protein content, modification of the adhesion properties is necessary, so that after the heat treatment and cooling, that is to say in the finally cooled state, no residues of the food product stick to the inner surface of the sausage casing during peeling and are torn off from the peeled sausage. According to the invention, the adhesion of the inner layer can be set specifically, without, for example, the inside of the tubular films needing to be sprayed with an oil mixture or a release wax in order to vary the adhesion properties.

As a result of the varied composition of the inner polymer layer, the mechanical properties of the tubular film also vary, so that special requirements can be made of the middle polymer layer in particular with respect to the intermediate layer adhesion and coloring.

The inventive multilayer tubular film permits, with its special structure of the middle polymer layer, substantial variation of the inner polymer layer for adaptation to a multiplicity of possible food products.

The inventive multilayer tubular film also meets the requirements listed hereinafter and thus demonstrates a balanced profile of properties for the most varied applications:

Strength

The film material must withstand a high stuffing pressure of 1 to 2 bar, as is usual in the meat industry. The tubular film must run smoothly on conventional automated clipping machines. At the same time, it must easily be possible to achieve the recommended stuffing caliber, and the elastic deformation of the film must result as far as possible in true-caliber regular products.

Heat Stability

The product stuffed into the tubular film should, as far as possible, not have any excessive or irregular deformation after the heat treatment (customary temperatures for scalded-emulsion and cooked-meat sausage).

Barrier Property

Sufficient oxygen barrier property of the film is that which prevents premature oxidation (inter alia, including gray discoloration of the sausage) and makes it possible to store the sausage for several weeks without significant color changes or other unwanted secondary reactions. A sufficient water vapor barrier property also makes it possible to store a sausage or a food packaged in the casing for a week without significant loss of weight.

Emulsion Adhesion

Adhesion capacity of the sausage casing to the filling (generally sausage meat emulsion) is frequently spoken of. This is termed preventing or decreasing the deposition of gel. However, in practice, the affinity of the inner layer of the sausage casing is always different, depending on the formulation, heat treatment, cooling method chosen, the internal pressure etc. For this reason, an adhesion predetermined by the polyamide composition cannot always be termed optimum. The object of the sausage casing manufacturer is to provide a selectable adhesion to the filling (sausage meat emulsion, boiled ham and other cooked cured products, fish emulsion etc.), which can be adapted by the user in practice to his or her requirements.

Shirrability

It is not only the object to produce a sausage casing which can be shirred perfectly on high performance shirring systems (high compression, high speeds, etc.), but, after the heat treatment and cooling, the sausage casing must have as far as possible no shirring marks, or shirring marks which are only visible with great difficulty. Not all of the sausage casings available on the market are distinguished by this property, that is to say small cracks are observed on the surface or at least marks which have not disappeared after heat treatment, spraying and cooling. The optimum casing must, in this sense, be so matched in composition (thickness, selection of materials, layer structure, etc.), that the surface as far as possible remains free from unwanted bending stresses caused during the shirring operation.

Practicality in Stuffing/Clipping

The ideal sausage casing made of polymer must be as easy to stuff as possible, but at the same time must demonstrate outstanding strength. Sausage casings which are too rigid can only be successfully processed mechanically using a clipper having a casing brake. The object must be to be able to stuff this casing by hand also, even if the end tie is performed by means of a manual tabletop clipper. This is dependent not only on the non-slip property of the material, but also on the composition and mechanical properties of the material.

The inventive multilayer tubular film is preferably biaxially oriented and thermo-set. In particular it is a coextruded tubular film. The tubular film is shrinkable due to the biaxial orientation and thermosettng. The shrinkage value in at least one direction is preferably a maximum of 15% at 90° C.

The inventive multilayer tubular film comprises the specified three layers and is preferably made up of these layers. The middle layer, in turn, can be made up in three layers from two layers based on ethylene-maleic anhydride copolymers and/or ethylene-$C_{1-8}$-alkyl acrylate-maleic anhydride copolymers having an intermediate layer based on ethylene-$C_{1-8}$-alkyl acrylate copolymer.

Preferably, the middle polymer layer is made up on the basis of ethylene-methyl acrylate copolymers and ethylene-maleic anhydride copolymers or ethylene-butyl acrylate-maleic anhydride copolymers. This can be a blend of the two copolymers, or the middle polymer layer can be made up with three layers, of an ethylene-methyl acrylate middle layer and, joined to it, two ethylene-maleic anhydride copolymer layers or ethylene-butyl acrylate-maleic anhydride copolymer layers.

The middle polymer layer is preferably made up of 50 to 80, particularly preferably 60 to 70%, by weight of ethylene-methyl acrylate copolymers and 20 to 50, preferably 30 to 40%, by weight of ethylene-maleic anhydride copolymers or ethylene-butyl acrylate-maleic anhydride copolymers.

In the ethylene-methyl acrylate copolymer, the methyl acrylate content is preferably 5 to 30% by weight, in particular 9 to 20% by weight, especially 9 or 20% by weight.

The carboxyl-containing ethylene copolymer or its salts are frequently also termed ionomers. This is, for example, an Na or Zn ionomer of an ethylene-acrylic acid copolymer having an acrylic acid content of preferably 1 to 20, particularly preferably 2 to 5, in particular about 3.5%, by weight.

The ethylene-butyl acrylate-maleic anhydride copolymer preferably, in addition to ethylene, has 5 to 10% by weight, particularly preferably 7 to 9% by weight, in particular about 8% by weight, of butyl acrylate and 1 to 5% by weight, particularly preferably 1 to 3% by weight, in particular 2% by weight, of maleic anhydride.

The ethylene-maleic anhydride copolymer preferably contains 0.15 to 5% by weight, particularly preferably 0.5 to 3% by weight, in particular 0.5 to 1.5% by weight, of maleic anhydride units.

The copolymers can be prepared by copolymerizing the monomers or by grafting of olefin copolymers with unsaturated esters, acids or anhydrides. Such graft copolymers which can be used according to the invention and blends thereof are described, for example, in U.S. Pat. No. 6,166,142. For example, a polyethylene grafted with maleic anhydride can be used. The polyethylene can be chosen freely here. For example, LDPE, LLDPE or HDPE can be used. Such polyethylene types are described in more detail in U.S. Pat. No. 6,166,142.

Polymer systems used in the invention as middle layer are, for example, blends of EBA, EAA or EMA with a maleic-anhydride-grafted polyolefin, in particular polyethylene. Combinations of EMA with EAA or of EMA with EBA are also possible according to the invention.

Preferably, the outer polymer layer is made up, based on the outer layer, of 40 to 95, particularly preferably 60 to 90%, by weight of nylon 6, 3 to 25, particularly preferably 5 to 15%, by weight of partially aromatic nylon 6I/6T, 1 to 15, preferably 3 to 5%, by weight of copolyamide 6/66, 1 to 30, preferably 3 to 20%, by weight of meta-xylylene-containing partially aromatic nylon 6, 1 to 30, preferably 2 to 20%, by weight of carboxyl-containing ethylene copolymers or their salts, the total amount of which gives 100% by weight.

Nylon 6 is made up, for example, a caprolactam or aminonitrile. The partially aromatic nylon 6I/6T is a polyamide of hexamethylenediamine and isophthalic acid and terephthalic acid. A copolyamide of caprolactam and hexamethylenediamine/isophthalic acid or hexamethylenediamine/terephthalic acid can also be used.

Nylon 6/66 is a copolyamide of monomers of nylon 6 and monomers of nylon 66. Preferably, 85 parts of the nylon 6 monomer and 15 parts of the nylon 66 monomer are present.

Further polymers which come into consideration in the individual layers are those polymers which preferably are miscible with the base polymers of the individual layers. These are other polyamides, polyolefins, modified polyolefins or similar polymers. Preferably, the outer polymer layer is made up of the above-specified polymers. The same applies to the middle polymer layer. The inner polymer layer preferably has no other polymers in addition to the polyamides and the carboxyl-containing ethylene copolymers or their salts.

In the inner polymer layer, the composition of the polyamides and the content of the carboxyl-containing ethylene copolymers or their salts can be set in such a manner as to give a suitable adhesion to the foods (sausage meat emulsion) to be received.

The inventive multilayer tubular film is preferably a three- or five-layer film, particularly preferably a three-layer film.

Preferably, the content of the outer layer is 40 to 75% by weight, of the middle layer is 10 to 50% by weight, and of the inner layer is 5 to 25% by weight, the total weight making 100% by weight. In the case of the three-layer film, the middle layer is a single layer, while in the case of the five-layer film, the middle layer is made up of three layers, as described above.

The inventive multilayer tubular film can be produced by various known processes. Preferably, it is produced by coextruding the (co)polymers forming the layers. Suitable coextrusion processes are known to those skilled in the art.

The inventive multilayer tubular films are used, in particular, as packaging casing for pasty filling (sausage casing). The pasty filling is in particular a food, specifically sausage or meat products. However, it is also possible to stuff the tubular films with non-food products.

The invention also relates to a meat product which is enclosed by a multilayer tubular film as described above.

The invention is described in more detail below with reference to examples.

Using a 3- and 5-layer example system for producing biaxially oriented, thermoset tubular films, various layer structures and compositions specified in table 1 were fabricated.

For the outer nylon layer, a 50 mm extruder was used, and for the other layers a 35 mm extruder was used. The melt temperatures in the nylon extruder for the outer and inner layers were 250 to 262° C. (depending on the formulation) and, in the other extruders for the middle layer or the 3 middle layers, approximately 195 to 210° C., depending on the formulation. The melt temperature in the multilayer head (3- and 5-layer head) was 268° C.

The film tube (what is termed the primary tube) is pulled through a cold water bath (4° C.) and this achieves the primary tube diameter. In a second water bath (75 to 95° C.) the primary tube is heated and is then stretched (biaxially oriented) to three times (lengthwise and transverse) between two roller pairs using an enclosed compressed air bubble (stretching bubble or secondary tube).

After the orientation the tube (tertiary tube) is shrunk again between two roller pairs using a compressed air bubble (tertiary bubble) in a hot-air tunnel (residence time approximately 6 to 7 seconds) at a temperature of 135 to 200° C., i.e. thermoset. After thermosetting the tube is cooled and wound up using controlled tension.

The examples described below were carried out on a three-layer and five-layer tube coextrusion line. All experiments which are to examine the functionality of the inner layer were only performed on a three-layer system.

Polymers Used
Outer Layer (A)

The outer layer polymers were processed using a 50 mm extruder and were homogeneously distributed in advance using a metering system.

Polyamide Blend 1:

Nylon 6 of a melting point of approximately 220° C. The concentration used was between 60 and 90% by weight of the total outer layer.

Polyamide (aliphatic) containing meta-xylylene groups (MXD 6) of a melting point of approximately 243° C. The concentration most used was between 4 and 20% by weight of the total outer layer, depending on the additive and color concentration, and also the concentration of amorphous nylon (nylon 6I/6T).

Aromatic nylon (nylon 6I/6T); the concentration varied as a function of the dye concentration, on the amount of MXD 6, etc., but was generally between 3 and 15%.

ZM isomers of ethylene-acrylic acid copolymers containing 3.5 to 10% acrylic acid Middle Layer (B)

The polymers of the middle layer were processed using a 35 mm single-screw extruder and distributed homogeneously in advance using a metering system. In the 3-layer structure, the middle layer (B2) principally consists of a blend of EMA and EAA. In the 5-layer structure, the middle layer consists of 3 layers: a core layer of EMA and two layers adhering to polyamide either of EAA or again of a blend of EMA+EAA.

Blend of the B Layer (Mentioned as B 1, B2 and B3)

Ethylene/methyl acrylate copolymer (EMA) has a methyl acrylate content of 9 or 20% by weight. The concentration of EMA used was between 60 and 70% by weight, depending on the formulation of the outer layer, the dye concentration of the middle layer and/or outer layer, etc. Ethylene-butyl acrylate-maleic anhydride copolymer (EAA): this is a copolymer of 90% ethylene, 8% butyl acrylate and 2% maleic anhydride. The EAA concentration of 30 to 40% by weight was the most used in all experiments.

Inner Layer (C)

The polymers of the inner layer were processed using a 35 mm extruder and, as in the other cases, homogeneously distributed in advance via a metering system.

The experimental series of the many different combinations of the inner layer were completed using a 3-layer tubular film, and the results were evaluated as such:

Polyamide Blend 1:

Nylon 6 as already described in the outer layer. The concentration used was 50 to 60% by weight.

Copolyamide (nylon 6/66) in concentrations of 5 to 40% by weight depending on the ionomer concentration or ionomer/nylon concentration used or the relatively low concentration of the amorphous nylon.

Aromatic polyamide (nylon 6I/6T) as already described in the outer layer. The concentration here was 5 to 15% by weight.

Ionomers (Surlyn® from Du-Pont)-zinc ionomer types were used and one single Na ionomer type as follows:

Ionomer 1: Surlyn ® 1801
Ionomer 2: Surlyn ® 1650
Ionomer 3: Surlyn ® AM 7962 (polyamide-modified ionomer)
Ionomer 4: Surlyn ® 1601 - Na ionomer type
Ionomer 5: Surlyn ® 1652
Ionomer 6: Surlyn ® 1702

Lothader® 4700 (terpolymer of ethylene, 26.5-32.5% of ethylene acrylate and 1.1-1.5% of maleic anhydride)

The experimental series are summarized in tables 1-1 and 1-2 below and the results are evaluated with respect to adhesion of the modified inner layer to the food product (scalded-emulsion sausage meat and boiled ham mixture having a high protein content).

Table 1-1: Presentation of the results of experimental series 1-6

Table 1-2: Presentation of the results of experimental series 7-12.

TABLE 1-1

Presentation of the results of the experimental series

| | | 1 | | 2 | | 3 | | 4 | | 5 | | 6 | |
|---|---|---|---|---|---|---|---|---|---|---|---|---|---|
| A | (Outer) | Polyamide blend 1 | 35 | Polyamide blend 1 | 34 | Polyamide blend 1 | 34 | Polyamide blend 1 | 35 | Polyamide blend 1 | 35 | Polyamide blend 1 | 35 |
| B | B1 | | | EAA | 3 | EMA + EAA | 3 | | | | | | |
| | B2 | EMA + EAA | 10 | EMA | 5 | EMA | 5 | EMA + EAA | 10 | EMA + EAA | 10 | EMA + EAA | 10 |
| | B3 | | | EAA | 3 | EMA + EAA | 3 | | | | | | |
| C | (Inner) | Polyamide blend 2 | 5 | Polyamide blend 2 | 5 | Polyamide blend 2 | 5 | Polyamide blend 3 | 5 | Polyamide blend 4 | 5 | Polyamide blend 5 | 5 |
| Total number of layers | | 3 | 50 μm | 5 | 50 μm | 5 | 50 μm | 3 | 50 μm | 3 | 50 μm | 3 | 50 μm |
| Adhesion to emulsion 1 | | +++++ | | +++++ | | +++++ | | +++++ | | ++++ | | ++++ | |
| Adhesion to emulsion 2 | | +++++++ | | +++++++ | | +++++++ | | ++++++ | | +++++ | | | |
| Adhesion to ham | | ++++++++ | | ++++++++ | | ++++++++ | | +++++++ | | ++++++ | | | |

Polyamide blend 1:

| Nylon 6 | 60–90% |
| MXD-6 | 4–20% |
| Aromatic Polyamide | 3–15% |

Polyamide blend 2:

| Nylon 6 | 60% |
| Copolyamide | 30% |
| Aromatic polyamide | 10% |

Polyamide blend 3:

| Nylon 6 | 65% |
| Copolyamide | 30% |
| Ionomer 1 | 5% |

Polyamide blend 4:

| Nylon 6 | 65% |
| Copolyamide | 30% |
| Ionomer 2 | 5% |

Polyamide blend 5:

| Nylon 6 | 50% |
| Copolyamide | 20% |
| Ionomer 3 | 30% |

TABLE 1-2

Presentation of the results of the experimental series

| | | 7 | | 8 | | 9 | | 10 | | 11 | | 12 | |
|---|---|---|---|---|---|---|---|---|---|---|---|---|---|
| A | (Outer) | Polyamide blend 1 | 35 | Polyamide blend 1 | 34 | Polyamide blend 1 | 34 | Polyamide blend 1 | 35 | Polyamide blend 1 | 35 | Polyamide blend 1 | 35 |
| B | B1 | | | | | | 3 | | | | | | |
| | B2 | EMA + EAA | 10 | EMA + EAA | 10 | EMA + EAA | 10 | EMA + EAA | 10 | EMA + EAA | 10 | EMA + EAA | 10 |
| | B3 | | | | | | 3 | | | | | | |

TABLE 1-2-continued

| C (Inner) | Polyamide blend 6 | 5 50 μm | Polyamide blend 7 | 5 50 μm | Polyamide blend 8 | 5 50 μm | Polyamide blend 9 | 5 50 μm | Polyamide blend 10 | 5 50 μm | Polyamide blend 11 | 5 50 μm |
|---|---|---|---|---|---|---|---|---|---|---|---|---|
| Total number of layers | 3 | | 5 | | 5 | | 3 | | 3 | | 3 | |
| Adhesion to emulsion 1 | ++++ | | +++ | | +++++ | | ++ | | ++ | | + | |
| Adhesion to emulsion 2 | +++++ | | +++++ | | ++++++ | | ++++ | | ++++ | | +++ | |
| Adhesion to ham | ++++++ | | ++++++ | | +++++++ | | +++++ | | +++++ | | +++++ | |

Polyamide blend 6:

| Nylon 6 | 40% |
| Copolyamide | 10% |
| Aromatic Polyamide | 50% |

Polyamide blend 7:

| Ionomer 3 | 100% |

Polyamide blend 8:

| Nylon 6 | 65% |
| Copolyamide | 30% |
| Ionomer 4 | 5% |

Polyamide blend 9:

| Nylon 6 | 50% |
| Copolyamide | 15% |
| Ionomer 5 | 35% |

Polyamide blend 10:

| Nylon 6 | 45% |
| Copolyamide | 15% |
| Ionomer 6 | 40% |

Polyamide blend 11:

| Nylon 6 | 45% |
| Copolyamide | 15% |
| Lothader | 40% |

Discussion of Results

The experimental series was carried out using many scalded-emulsion and ham formulations, of which 12 examples were sought out as "typical" and reproduced in the tables.

For the experimental series presented, two scalded-emulsion formulations and one boiled ham formulation were chosen in order to illustrate the different degrees of film affinity (adhesion) to these types of sausage and ham.

Scalded-emulsion sausage meat 1 is a scalded-emulsion sausage produced without adding foreign protein (milk protein, soybean protein, etc.) or other binders (for example starch), for example as produced in Austria (Extrawurst as specified in chapter B 14—Codex Alimentarius Austriacus). This scalded-emulsion sausage represents a relatively labile emulsion, since the manufacturer comes quite close to the prescribed limiting values and is therefore very often confronted with formation of gel deposits. Obviously, here, the comminution method, type of heat treatment (temperature and method of controlling it), cooling method chosen, etc., are also of critical importance here.

Scalded-emulsion sausage meat 2 is a scalded-emulsion sausage produced using some of the abovementioned binders or foreign protein types. This scalded-emulsion sausage has "spare capacity" in binding, that is to say does not have any tendency to formation of gel deposit and is considerably firmer than the first-described quality grade.

Boiled ham was deliberately selected only in one quality grade: a turkey meat ham having a high protein content which is really problematic to peel using conventional plastic skins. This boiled ham formulation is also representative of other food mixtures having a high affinity to the unmodified polyamide.

Evaluating the results with respect to adhesion of the various scalded-emulsion and boiled ham formulations proved to be relatively problematic. Although, according to the literature, there have been attempts to measure objectively the force required for peeling (principally with raw meat sausage), this method in this case (scalded-emulsion sausage and boiled ham) offers too little differentiation, although in practice the differences are visually very great.

For this purpose, a scale for visual evaluation of the adhesion to the film inner surface was developed, which is readily understandable to those skilled in the art.

| Symbol | Description of the film inner surface on peeling |
|---|---|
| ++++++++ | During peeling the entire inner surface of the casing covered with meat blend - unappetizing appearance of the peeled sausage |
| +++++++ | Coarse residues left isolated on the inner surface of the casing - greater and lesser adhesion irregularly distributed |

-continued

| Symbol | Description of the film inner surface on peeling |
|---|---|
| ++++++ | Small residues on the inner surface of the casing - visually not unappetizing, but also not optimum |
| +++++ | Optimum adhesion, easy peeling, no residues on the inner surface of the film, but also clean peeled sausage surface |
| ++++ | Very small, almost invisible surfaces with gel deposition - adhesion rather too low |
| +++ | Marked gel deposition - insufficient adhesion |
| ++ | More gel deposition on areas adhering to film inner surface - unappetizing appearance of the peeled sausage |
| + | Encircling gel deposition |

EXAMPLE 1

The inner layer is not modified with ionomers and, in addition to nylon 6, also contains a copolyamide (nylon 6,66) and an aromatic polyamide (nylon 6I/6T). In accordance with expectation, this sausage casing had the highest adhesion. In the case of the scalded-emulsion sausage 1, this adhesion proved to be optimum, but in the case of scalded-emulsion sausage 2 this was too high. With the turkey ham having a high protein content, peeling was so problematic that the appearance both of the film and of the peeled product was unacceptable.

EXAMPLE 2

In this example the inner layer was identical, but the film was produced in a 5-layer structure PA/EAA/EMA/EAA/PA. The mechanical properties and the permeability (oxygen and water vapor) of this film were very similar to the film in example 1. From practical aspects, this film could scarcely be distinguished from the other. The purpose this time was to investigate the adhesion of the individual layers, in particular in the 5-layer structure in examples 2 and 3.

EXAMPLE 3

As in example 2, the inner layer was identical but instead of EAA in layer B1 and B2, a blend of 70% by weight of EMA and 30% by weight of EAA was used. Under practical conditions (peeling, tearing, etc.) and even at high adhesion of the meat mix (turkey ham), the cohesion of the layers in examples 1 to 3 remained good.

EXAMPLE 4

With example 4, the experiments of modifying the inner layer begin—in this case with the addition of a minimal amount of a zinc ionomer (Surlyn® 1801). The difference from examples 1 to 3 (maximum adhesion) is slight. Fine changes on the film surface are observed.

EXAMPLE 5

The results of example 5 with respect to adhesion of the film to the meat mix were identical to those of example 4.

EXAMPLE 6

In this case the amount of a polyamide-modified ionomer (Surlyn® AM 7926) added was greater, so that in the case of the scalded-emulsion sausage 1, without addition of binders and foreign protein, the first extremely small areas with gel deposition could be observed. In contrast, the scalded-emulsion sausage produced using binders was now optimum in adhesion.

EXAMPLE 7

The results of example 7 with respect to adhesion of the film to the meat mix were virtually identical to those of example 6.

EXAMPLE 8

The adhesion of the film inner surface fell, so that the scalded-emulsion sausage 1 already had an unacceptable appearance and the scalded-emulsion sausage 2 was still optimum. The turkey ham could only be described as optimum in this experiment, that is to say without residues on the film inner surface.

EXAMPLE 9

Owing to the relatively low amount of sodium ionomer (Surlyn® 1601) added, the degree of modification was relatively low. The results of example 9 are similar to example 5 with respect to adhesion.

EXAMPLES 10, 11 and 12

The degree of modification was higher, so that both scalded-emulsion sausages already exhibited too much gel deposition and the ham having a high protein content still remained optimum in peeling behavior.

All experimental series were carried out under industrial conditions, that is to say for each sausage or each type of ham in a different meat-processing plant and repeated many times. Only three meat products mentioned were selected as representative and contrasting, although experiments with some other formulations were carried out. It was important in the test series that the meat processing plant always employed the same manufacturing conditions. As is known, slight differences in heat treatment or cooling can falsify the results and make evaluation difficult in this manner. For this reason the studies concentrated on constant industrial conditions and formulations typical for the respective region.

The invention claimed is:
1. A multilayer seamless tubular film comprising
an outer polymer layer in which the polymer comprises 70 to 100% by weight of aliphatic or partially aromatic polyamides or copolyamides or blends thereof, and 0 to 30% by weight of other polymers,
a middle polymer layer which consists essentially of 50 to 80% by weight of ethylene-methyl acrylate copolymers, wherein the methyl acrylate content is 5 to 30% by weight, and 20 to 50% by weight of ethylene-maleic anhydride copolymers, which contain 0.15 to 5% by weight of maleic anhydride units, and
an inner polymer layer in which the polymer comprises 40 to 100% by weight of aliphatic or partially aromatic polyamides or copolyamides or blends thereof, 0 to 60% by weight of carboxyl-containing ethylene copolymers or their salts and 0 to 20% by weight of other polymers, the total amount of which gives 100% by weight.
2. A multilayer tubular film as claimed in claim 1, wherein the tubular film is shirred.
3. A multilayer seamless tubular film for packaging a meat product, comprising:

a tubular shape having a wall thickness and a strength suitable for fitting on a machine for stuffing the tubular film under pressure with a meat product, an inner polymer layer in which the polymer comprises 40 to 100% by weight of aliphatic or partially aromatic polyamides or copolyamides or blends thereof; 0 to 60% by weight of carboxyl-containing ethylene copolymers or their salts and 0 to 20% by weight of other polymers, the total amount of which gives 100% by weight, the inner layer composition being selected to achieve a preselected degree of adhesion with respect to the type of meat product to be filled into the tubular film, an outer polymer layer in which the polymer comprises 70 to 100% by weight of aliphatic or partially aromatic polyamides or copolyamides or blends thereof, and 0 to 30% by weight of other polymers, and a middle polymer layer which consists essentially of 50 to 80% by weight of ethylene-methyl acrylate copolymers, wherein the methyl acrylate content is 5 to 30% by weight, and 20 to 50% by weight of ethylene-maleic anhydride copolymers, which contain 0.15 to 5% by weight of maleic anhydride units, the composition of the middle layer being selected to complement the composition of the inner layer and to thereby provide optimum properties for the packaged meat product depending on the type of meat product to be filled into the tubular film.

4. The multilayer seamless tubular film of claim 1, wherein:
the polymer of the inner polymer layer comprises 40 to 99% by weight of aliphatic or partially aromatic polyamides or copolyamides or blends thereof, and 1 to 60% by weight of carboxyl-containing ethylene copolymers or their salts.

5. The multilayer seamless tubular film for packaging a meat product of claim 3, wherein:
the polymer of the inner polymer layer comprises 40 to 99% by weight of aliphatic or partially aromatic polyamides or copolyamides or blends thereof, and 1 to 60% by weight of carboxyl-containing ethylene copolymers or their salts.

6. The tubular film as claimed in claim 1, which is biaxially oriented and thermoset.

7. The tubular film as claimed in claim 1, wherein the tubular film has a shrinkage value in at least one direction of a maximum of 15% at 90° C.

8. The tubular film as claimed in claim 1, wherein the middle layer comprises three layers, such that in two layers the polymer comprises ethylene maleic anhydride copolymers, while an intermediate third layer comprises said at least one layer.

9. The tubular film as claimed in claim 1, wherein the polymer of the outer polymer layer comprises 40 to 95% by weight of nylon 6, 3 to 25% by weight of partially aromatic nylon 6I/6T, 1 to 15% by weight of copolyamide 6/66, 1 to 30% by weight of meta-xylylene-containing partially aromatic nylon 6, 1 to 30% by weight of carboxyl-containing ethylene copolymers or their salts, the total amount of which gives 100% by weight based on the weight of the outer layer.

10. A process for producing multilayer tubular films as claimed in claim 1 by coextruding the co(polymers) forming the layers.

11. A meat product which is enclosed by a multilayer tubular film as claimed in claim 1.

12. The tubular film as claimed in claim 1, wherein:
the polymer of the outer polymer layer comprises 70 to 100% by weight of aliphatic or partially aromatic polyamides or copolyamides or blends thereof;
the polymer of the inner polymer layer comprises 40 to 100% by weight of aliphatic or partially aromatic polyamides or copolyamides or blends thereof, and 0 to 60% by weight of carboxyl-containing ethylene copolymers or their salts.

13. The multilayer seamless tubular film of claim 4, wherein the carboxyl-containing ethylene copolymer is an ethylene-acrylic acid copolymer having an acrylic acid content of 1-20% by weight, and its salt is sodium salt or zinc salt.

* * * * *

UNITED STATES PATENT AND TRADEMARK OFFICE
CERTIFICATE OF CORRECTION

PATENT NO.        : 8,137,772 B2
APPLICATION NO.   : 09/946960
DATED             : March 20, 2012
INVENTOR(S)       : Zoran Savic It is certified that error appears in the above-identified patent and that said Letters Patent is hereby corrected as shown below:

Title Page:

Item (75) "Zoran Savic, Vienna (AT)," should be changed to --Zoran Savic, Wien (AT)--.

Signed and Sealed this
Fifth Day of June, 2012

David J. Kappos
*Director of the United States Patent and Trademark Office*